US009815443B2

(12) United States Patent
Miller

(10) Patent No.: US 9,815,443 B2
(45) Date of Patent: Nov. 14, 2017

(54) BRAKE SELECTION SYSTEM AND METHODS

(71) Applicant: THE BOEING COMPANY, Huntington Beach, CA (US)

(72) Inventor: Trent Daryl Miller, Seattle, WA (US)

(73) Assignee: The Boeing Company, Chicago, IL (US)

(*) Notice: Subject to any disclaimer, the term of this patent is extended or adjusted under 35 U.S.C. 154(b) by 229 days.

(21) Appl. No.: 14/700,689

(22) Filed: Apr. 30, 2015

(65) Prior Publication Data

US 2016/0318492 A1    Nov. 3, 2016

(51) Int. Cl.
*B60T 1/00* (2006.01)
*B60T 8/17* (2006.01)
*B60T 8/32* (2006.01)
*B64C 25/42* (2006.01)

(52) U.S. Cl.
CPC .......... *B60T 8/1703* (2013.01); *B60T 8/325* (2013.01); *B64C 25/42* (2013.01)

(58) Field of Classification Search
CPC .................. B60G 2400/70; B60G 2204/115
See application file for complete search history.

(56) References Cited

U.S. PATENT DOCUMENTS

| 5,050,110 A * | 9/1991 | Rott ................. B60C 23/20 116/34 R |
| 6,398,162 B1 * | 6/2002 | Stimson ................ B60T 8/00 188/16 |
| 6,478,252 B1 | 11/2002 | Stimson et al. |
| 6,851,649 B1 | 2/2005 | Radford |
| 7,165,816 B2 | 1/2007 | DeVlieg |
| 7,281,684 B2 | 10/2007 | Steiner et al. |
| 7,963,620 B2 | 6/2011 | DeVlieg |

(Continued)

FOREIGN PATENT DOCUMENTS

| EP | 1693262 A1 | 8/2006 |
| EP | 2 615 005 A1 | 7/2013 |

(Continued)

OTHER PUBLICATIONS

Extended European Search Report for Application No. 16161624.8, Sep. 28, 2016, 10 pages.

*Primary Examiner* — Redhwan K Mawari
(74) *Attorney, Agent, or Firm* — Armstrong Teasdale LLP

(57) ABSTRACT

Methods and apparatuses for selecting a plurality of brake assemblies desired for activation during an aircraft taxi braking event from a total number of brake assemblies are disclosed. One method includes determining an estimated peak temperature for each brake assembly and determining a first subset of the brake assemblies having an estimated peak temperature within a predetermined temperature range. The method also includes determining whether the number of first subset brake assemblies is greater than or equal to the number of brake assemblies desired for braking. At least a portion of the first subset brake assemblies is then activated if the number of brake assemblies in the first subset is determined to be greater than or equal to the number of desired brake assemblies, wherein the number of brake assemblies in the activated portion of the first subset is greater than or equal to the number of desired brake assemblies.

20 Claims, 7 Drawing Sheets

(56) References Cited

U.S. PATENT DOCUMENTS

| | | | |
|---|---|---|---|
| 2006/0131464 A1* | 6/2006 | Hesser | B61K 9/06 246/169 D |
| 2006/0226698 A1 | 10/2006 | Riebe et al. | |
| 2010/0063703 A1 | 3/2010 | Clothier | |
| 2010/0222946 A1 | 9/2010 | Sauvinet | |
| 2010/0286881 A1 | 11/2010 | Cahill | |
| 2014/0156160 A1 | 6/2014 | DeVlieg et al. | |

FOREIGN PATENT DOCUMENTS

| | | | |
|---|---|---|---|
| JP | WO 2006068113 A1 * | 6/2006 | ......... B60C 23/0408 |
| WO | 9420344 | 9/1994 | |
| WO | 9608396 | 3/1996 | |
| WO | 2007084449 A2 | 7/2007 | |

* cited by examiner

BRAKE SELECTION SYSTEM AND METHODS

BACKGROUND

The present disclosure relates generally to aircraft braking systems and, more particularly, to brake selection systems and methods for reducing carbon brake wear.

Modern aircraft which are designed to carry large passenger or cargo payloads are often provided with carbon brakes on each of the wing or body mounted wheels. While carbon brakes are preferred over steel brakes for weight and performance reasons, the cost of replacing the stack divided by the number of landing cycles between replacements can be much higher than for steel brakes. Further, carbon brakes primarily wear based on the number of applications (including taxi braking), whereas steel brakes primarily wear based on the amount of heat energy generated. Therefore, steel brake wear is less sensitive to the number of taxi brake applications.

At least one known braking method includes evenly dividing the braking energy between all of the brakes by activating all the brakes equally. By activating all brakes equally, no individual brake absorbs an excess of energy. For steel brakes, brake life is largely determined by the total amount of energy absorbed by each brake and is comparatively unaffected by the number of brake applications that accumulate that energy. Hence, brake control systems that activate all brakes simultaneously and equally provide economic operation of steel brakes and reduce exposure to overheating of any individual brake. In contrast to steel brake wear, carbon brake wear has been found to correlate significantly with the number of brake applications. Specifically, most carbon brake wear tends to occur during taxiing, as the brakes may be activated routinely in negotiating the taxiways between the runway and the gate and in stop-and-go traffic that may be encountered in the queue for take-off. As such, application of the steel braking method to carbon brakes may significantly shorten the operating lifetime of carbon brakes.

An additional important factor in the wear rate of carbon brakes is the brake core temperature. Depending on the wear state and the unique and transient friction characteristics of individual brakes, there is typically significant brake core temperature variance between brake positions on an aircraft such that the temperature varies brake-to-brake. Variance in brake cooling rate can exacerbate these brake temperature differences depending, for example, on the relative proximity to air flow.

Another known braking method includes only activating as many brakes that are necessary for that particular taxi braking event. Such systems may sequentially cycle through the brakes such that each brake is activated only a minimum number of times. However, as described above, some brakes will have higher core temperatures than others because some brakes absorb more heat energy from the same braking event than other brakes. Therefore, by merely cycling through the brakes for subsequent taxi braking events, some brakes may still be at a relatively high temperature, which may lead to increased brake wear or oxidation and limit the service lifetime of the brake.

Apart from brake wear, there is the consideration of the issue of carbon oxidation of very high temperature carbon. Carbon reacts with oxygen at high temperatures to gradually form oxides, which may limit the service lifetime of the brakes. During higher landing energy operations, there is often sufficient disparity between individual brake temperatures on an airplane such that some brake positions enter the high oxidation rate temperature range, whereas other brakes may be below the high oxidation rate threshold to allow additional taxi stops while still remaining below the threshold temperature.

Accordingly, there is a need for a brake selection system that limits the number of applications of each brake and that also monitors the brake temperature to reduce brake wear and oxidation.

SUMMARY

In one aspect, a method of selecting a plurality of brake assemblies desired for activation during an aircraft taxi braking event from a total number of brake assemblies is provided. The method includes determining an estimated peak temperature for each brake assembly of the total number of brake assemblies and determining a first subset of the total number of brake assemblies having an estimated peak temperature greater than a low threshold temperature and less than a high threshold temperature. The method also includes determining whether the number of brake assemblies in the first subset is greater than or equal to the number of brake assemblies desired for braking. At least a portion of the brake assemblies in the first subset is then activated if the number of brake assemblies in the first subset is determined to be greater than or equal to the number of desired brake assemblies, wherein the number of brake assemblies in the activated portion of the first subset is greater than or equal to the number of desired brake assemblies.

In another aspect, a taxi brake selection system for activating a desired number of brake assemblies during a taxi braking event is provided. The taxi brake selection system includes a plurality of brake assemblies and a plurality brake assembly temperature sensors, wherein each sensor is positioned proximate a respective one brake assembly of said plurality of brake assemblies. The taxi brake selection system also includes a taxi brake selection module communicatively coupled to the plurality of sensors. The taxi brake selection module is configured to receive signals indicative of a brake assembly temperature from each sensor of the plurality of sensors and determine an estimated peak temperature for each brake assembly of the plurality of brake assemblies based on the received temperature signals. The taxi brake selection module is further configured to determine a first subset of brake assemblies of the plurality of brake assemblies, wherein each brake assembly in the first subset of brake assemblies has an estimated peak temperature greater than a low threshold temperature and less than a high threshold temperature. The taxi brake selection module is further configured to determine whether the number of brake assemblies in the first subset is greater than or equal to a number of brake assemblies desired for braking and to activate at least a portion of the brake assemblies in the first subset for the next taxi braking event if the number of brake assemblies in the first subset is determined to be greater than or equal to the number of desired brake assemblies. The number of brake assemblies in the activated portion of the first subset is greater than or equal to the number of desired brake assemblies.

In yet another aspect, a computer-readable storage device comprising computer-executable instructions for selecting brake assemblies for use in a taxi braking event is provided. When executed by a taxi brake selection system, the computer-executable instructions cause the taxi brake selection system to determine an estimated peak temperature for each brake assembly of the total number of brake assemblies and determine a first subset of the total number of brake assemblies having an estimated peak temperature greater than a low threshold temperature and less than a high threshold temperature. The computer-executable instructions further cause the taxi brake selection system device to determine whether the number of brake assemblies in the first subset is greater than or equal to the number of brake assemblies desired for braking and activate at least a portion of the brake assemblies in the first subset for the next taxi braking event if the number of brake assemblies in the first subset is determined to be greater than or equal to the number of desired brake assemblies, wherein the number of brake assemblies in the activated portion of the first subset is greater than or equal to the number of desired brake assemblies.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

DETAILED DESCRIPTION

In one implementation, a computer program is provided, and the program is embodied on a computer-readable medium. In an example implementation, the computer program is executed on a single computing device, without requiring a connection to a server computer. The computer program is flexible and designed to run in various different environments without compromising any major functionality. In some implementations, the system includes multiple components distributed among a plurality of computing devices. One or more components may be in the form of computer-executable instructions embodied in a computer-readable medium. The systems and processes are not limited to the specific implementations described herein. In addition, components of each system and each process can be practiced independent and separate from other components and processes described herein. Each component and process can also be used in combination with other assembly packages and processes.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

Figure 1:
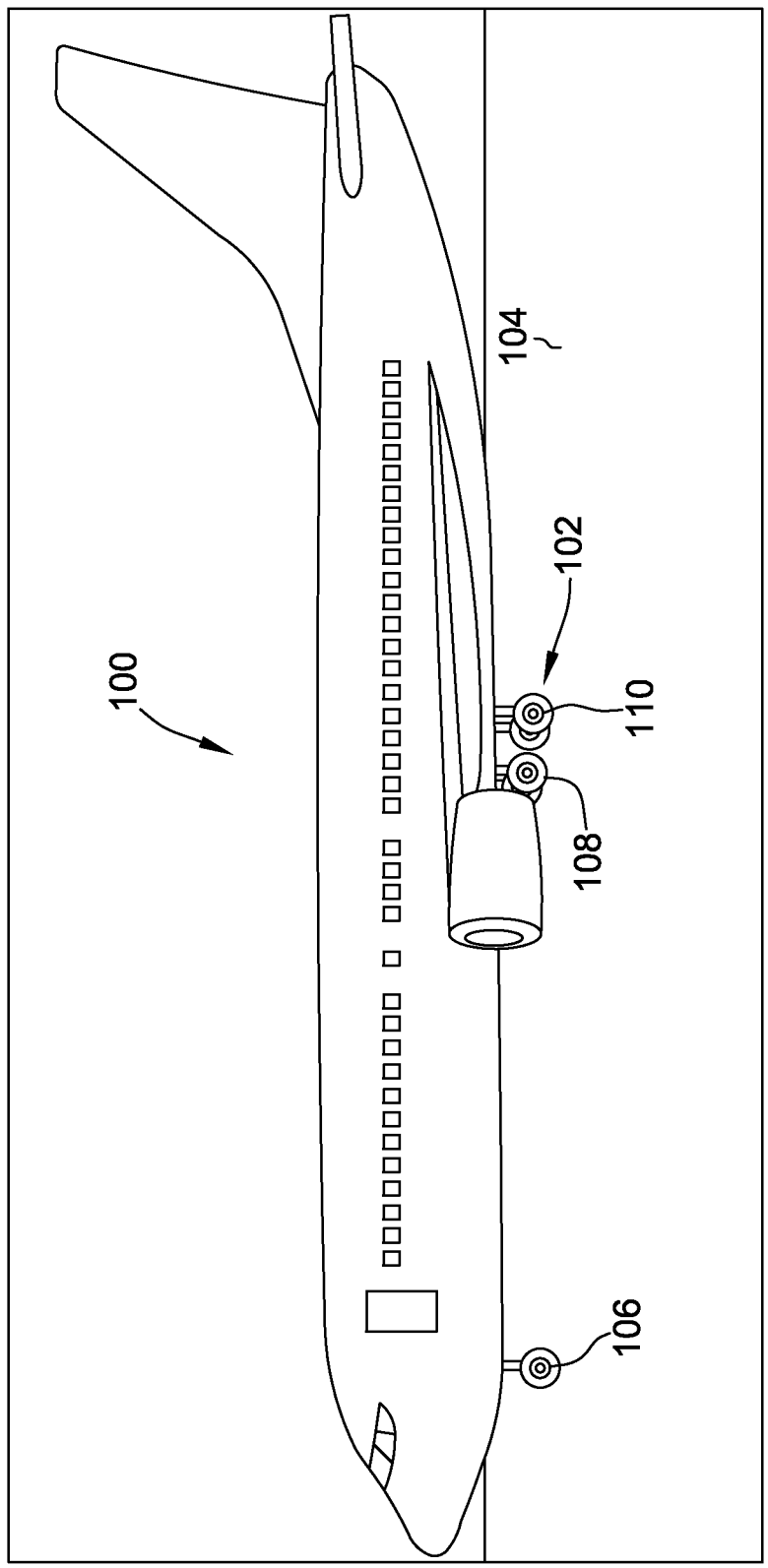
FIG. 1 illustrates an exemplary aircraft that may be used to implement example methods and apparatuses disclosed herein.

FIG. 1 illustrates an example aircraft 100, which may be used to implement methods and apparatuses to monitor components of an aircraft landing system are disclosed herein. In the illustrated example, the aircraft 100 includes a landing system 102 to support the aircraft 100 on a surface 104 (e.g., a runway) and enable the aircraft 100 to taxi, take off, land, etc. The example landing system 102 includes a front landing gear unit 106 and two rear landing gear units 108 and 110. However, the above-noted numbers of front and rear landing units are merely examples and, thus, other examples may employ other numbers of front landing gear units and/or rear landing gear units without departing from the scope of this disclosure.

To travel from one destination (e.g., airport) to another, the example aircraft 100 may perform a plurality of taxi braking events such as, for example, taxiing from a departure gate to a runway, landing, taxiing from a runway to an arrival gate, and parking During a given time period (e.g., one day), the example aircraft 100 may travel or be scheduled to travel to a plurality of destinations and, thus, perform or be scheduled to perform a plurality of taxi braking events.

Figure 2:
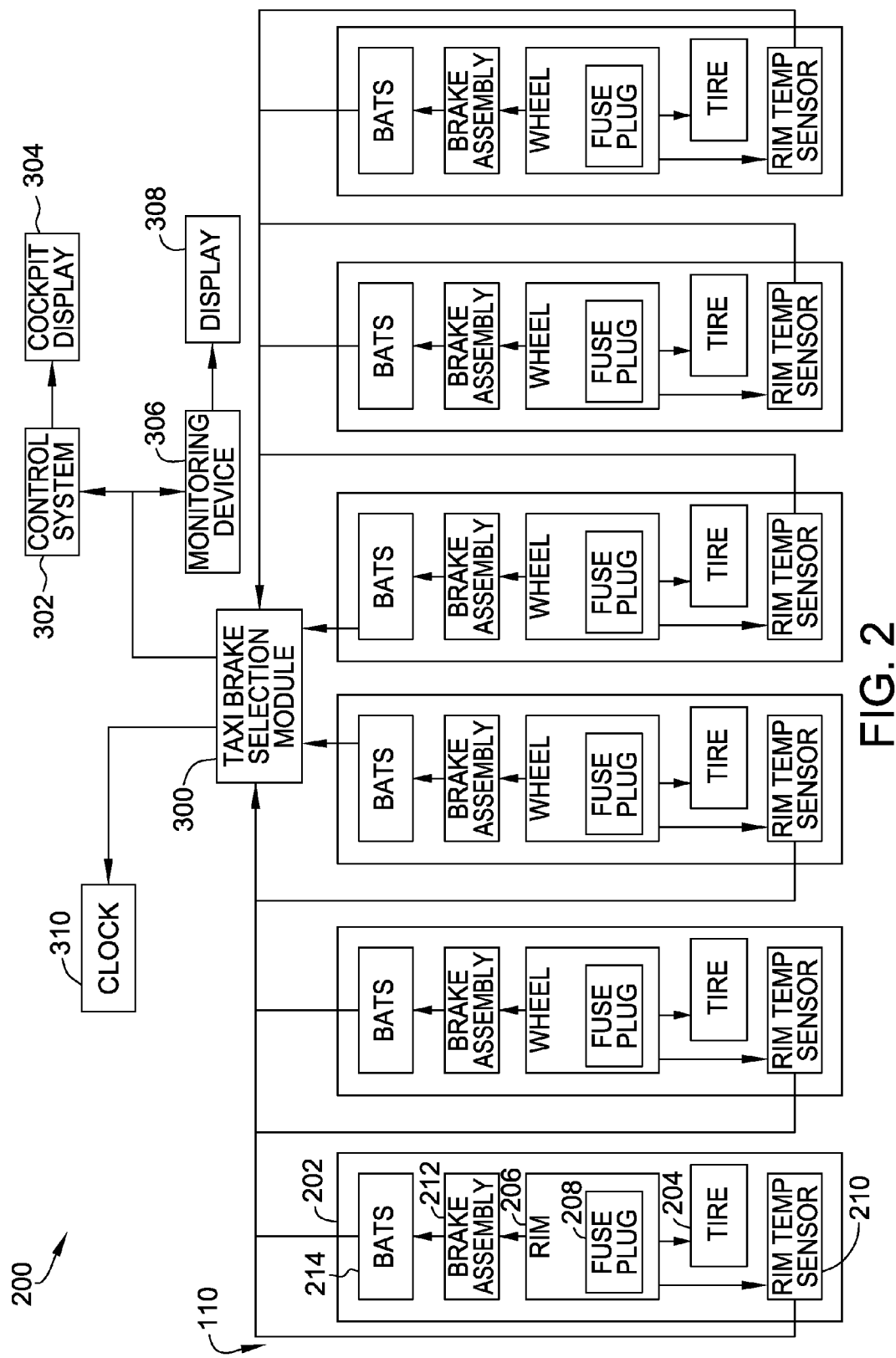
FIG. 2 is a block diagram of an exemplary brake selection control system.

FIG. 2 is a block diagram of an exemplary taxi brake selection control system 200 for rear landing gear unit 110. Taxi brake selection control system 200 includes a plurality of wheel assemblies 202 each having a tire 204, a rim 206, a fuse plug 208, a rim temperature sensor 210, a brake assembly 212, and a brake assembly temperature sensor (BATS) 214. Each rear landing gear unit 108 and 110 (shown in FIG. 1) includes a plurality of substantially similar wheel assemblies 202 that are each communicatively coupled to a taxi brake selection module 300. More specifically, as each landing gear unit 108 and 110 is independently operated by the pilot, each of landing gear units 108 and 110 include a separate taxi brake selection module 300 that is communicatively coupled to each wheel assembly 202. As such, each landing gear unit 108 and 110 is controlled by separate, but substantially similar, taxi brake selection control systems 200. Therefore, to avoid redundancy, only the taxi brake selection control system 200 including wheel assemblies 202 and brake selection module 300 for rear landing gear unit 110 will be described. However, it is contemplated that each landing gear unit 108 and 110 may be controlled by a single taxi brake selection control system 200.

In the exemplary implementation, rims 206 of each wheel assembly 202 are coupled to an axle (not shown) and tires 204 are coupled about a respective rim 206. Fuse plugs 208 are also coupled to a respective rim 206. Although only one fuse plug 208 per rim 206 is shown in the illustrated example, rim 206 may include a plurality of fuse plugs 208, which may be spaced apart along rim 206 (e.g., three fuse plugs radially spaced apart by about 120 degrees). Fuse plugs 208 are in communication with the interior space of tire 204 between rim 206 and tire 204. When a temperature of fuse plug 208 is below a fuse plug melting threshold temperature, fuse plug 208 enables tire 204 to be inflated and/or pressurized. If the temperature of fuse plug 208 reaches or exceeds the fuse plug melting threshold temperature, a portion (e.g., a eutectic core) of fuse plug 208 melts to release air from tire 204.

Rim temperature sensors 210 (e.g., a thermocouple) are positioned on or in a respective rim 206. In other examples, rim temperature sensors 210 are positioned in and/or on other portions of a respective wheel assembly 202 (e.g., in a tire inflation valve). Rim temperature sensors 210 acquire information related to a temperature of rim 206 ("rim temperature information"). As described in greater detail below, the temperature of rim 206 and the temperature of brake assembly 212 may be used to estimate a peak temperature of fuse plug 208 as a result of a taxi braking event.

In the exemplary implementation, brake assembly 212 are coupled within a tubewell (not shown) of rim 206 and include components such as a housing, brakes (e.g., one or more rotors and stators), pistons, and/or other components (none shown). When brake assemblies 212 are operated, the brakes convert kinetic energy of rims 206 into brake energy (e.g., heat energy). As a result, a temperature of entire brake assembly 212 increases. Brake temperature sensors 214 (e.g., a thermocouple) are coupled to a respective wheel assembly 202 to acquire information related to the temperature of brake assembly 210 ("brake temperature information"). Specifically, in one implementation, brake temperature sensors 214 are positioned a distance from the actual brakes such that brake temperature sensors 214 measure the temperature of the heat radiating from the brakes rather than the temperature of the brakes themselves. For example, brake temperature sensors 214 may be mounted on any other component of brake assembly 212, or to any other suitable component of landing gear unit 110, such as the axle. As described in greater detail below, the temperature of the brake assemblies 210, as sensed by a respective brake temperature sensor 214, may be used to interpolate a peak temperature of the associated brake as a result of a landing braking event.

As shown in FIG. 2, taxi brake selection module 300 is communicatively coupled to both brake temperature sensor 214 and to rim temperature sensor 210 of each wheel assembly 202 such that information sensed by sensors 210 and 214 is transmitted to module 300 for analysis, as described in further detail below. In the exemplary implementation, taxi brake selection module 300 determines which brake assemblies 212 of rear landing gear 110 to activate during an upcoming taxi braking event. More specifically, the brake selection module 300 uses the information provided by sensors 210 and 214 to calculate estimated peak brake temperatures and estimated peak wheel rim temperatures for each brake assembly 212 and determines which brake assemblies 212 to activate based on the resulting estimated peak temperatures. In the exemplary implementation, taxi brake selection module 300 is implemented by and/or in communication with an aircraft control system 302 positioned on aircraft 100 and displays results on a cockpit display 304. Alternatively, or in combination, taxi brake selection module 300 is implemented by a monitoring device 306 positioned outside of aircraft 100 (e.g., a portable or handheld device (e.g., a laptop, a smartphone, a portable diagnostic tool, etc.), a workstation (e.g., located in a maintenance facility, a ground control facility, etc.)) having an associated display 308. Generally, taxi brake selection module 300 may be implemented with any other suitable device and/or system.

During a landing braking event, kinetic energy is converted into brake energy via brake assemblies 212. As a result, heat is generated by brake assemblies 212. The heat may be transferred from brake assemblies 212 to rims 206, fuse plugs 208, and/or other components of landing gear unit 110. As a result, a temperature of brake assemblies 212 and rims 206 may increase following the landing braking event. After the braking event has concluded (e.g., during taxiing, upon takeoff, once aircraft 100 is parked, etc.), brake assemblies 212 and rims 206 may continue to absorb heat energy generated by the landing braking event. As a result, the temperatures of brake assemblies 212 and rims 206 may increase until a given amount of time after the taxi braking event has concluded.

During operation of example aircraft 100, brake assembly temperature sensor 214 communicates the brake temperature information for an associated brake assembly 212 to taxi brake selection module 300. Similarly, wheel rim temperature sensor 210 communicates the wheel temperature information for an associated rim 206 to taxi brake selection module 300. In the illustrated example, based on the temperature information, taxi brake selection module 300 determines which brake assemblies 212 of landing gear unit 110 to activate during the next taxi braking event.

Figure 3:
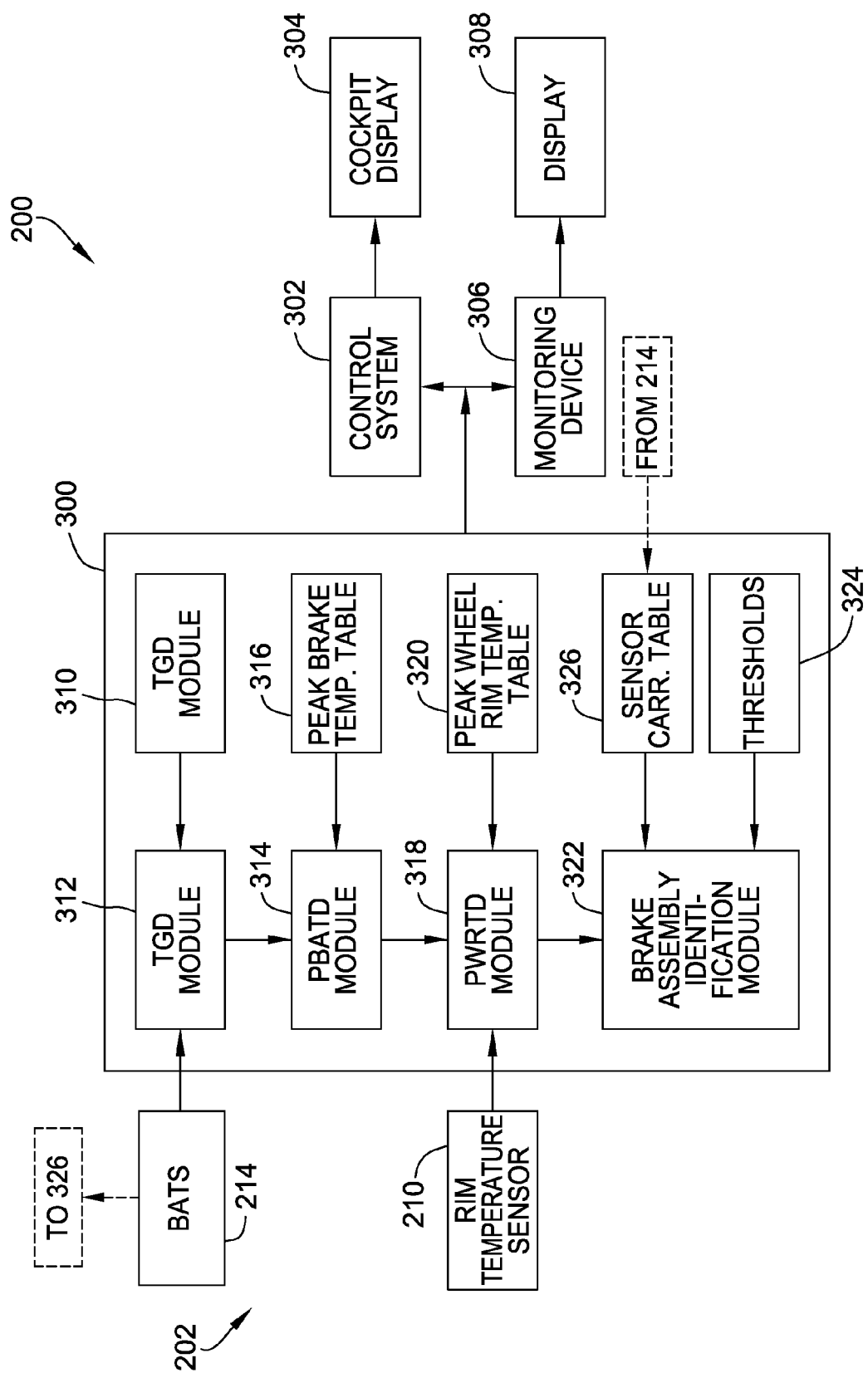
FIG. 3 is a block diagram of a brake selection module of the exemplary brake selection control system of FIG. 2.

FIG. 3 is a block diagram of taxi brake selection module 300 of the exemplary taxi brake selection system 200. During operation of taxi brake selection system 200, brake assembly temperature sensor 214 of each wheel assembly 202 communicates brake temperature information to taxi brake selection module 300 at a time shortly (within 30 seconds) after landing. Module 300 records the brake assembly temperatures as initial landing temperatures and also records a landing time, from a clock 310, of when the brake assembly temperatures were recorded. At a subsequent time (approximately 30-35 seconds later) brake assembly temperature sensors 214 communicate brake assembly temperature information to taxi brake selection module 300 and module 300 records this second set of brake assembly temperatures as brake assembly taxiing temperatures. A temperature gain determine (TGD) module 312 then determines an average rate of temperature gain for each brake assembly 212 by calculating the difference in the recorded taxiing and landing temperatures, and dividing the difference by the amount of time between when the recordings were taken, according to clock 310. A peak brake assembly temperature (PBATD) module 314 then determines an estimated peak brake assembly temperature for each brake assembly 212 based on the calculated gain by TGD module 312. PBATD module 314 includes a peak brake assembly temperature table 316 that determines the estimated peak brake assembly temperature based on the calculated gain and the initial landing temperature of a respective brake assembly 212 recorded at the landing time.

Taxi brake selection module 300 also includes a peak wheel rim temperature determination (PWRTD) module 318 that includes a peak wheel rim temperature table 320. Table 320 includes the estimated peak brake assembly temperatures as determined by PBATD module 314 and the wheel rim temperature information from sensor 210. PWRTD module 318 uses table 320 to determine an estimated peak wheel rim temperature of each wheel assembly 202.

Based on the estimated peak brake assembly temperatures from PBATD module 314 and the estimated peak wheel rim temperatures from PWRD module 318, a brake assembly identification module 322 identifies which brake assemblies 212 of landing gear unit 110 to activate during the next taxi braking event. More specifically, brake assembly identification module 322 compares the estimated peak brake assembly temperatures and peak wheel rim temperatures to a set of thresholds 324 and identifies which brake assemblies 212 to activate that are expected to reduce the amount of wear and have a substantially risk of causing oxidation.

In another implementation, taxi brake selection system 200 uses only brake assembly temperature information from temperature sensor 214 to determine which brake assemblies 212 of landing gear unit 110 to activate during the next taxi braking event, as described in further detail below.

As described above, the temperature of brake assemblies 212 continues to increase after landing and during taxiing. Taxi brake selection module 300 calculates the estimated peak brake assembly temperatures and then determines which brake assemblies 212 to activate during a taxi braking event based on those peak temperatures. However, after the aircraft 100 has landed and has spent a predetermined amount of time, between 7-15 minutes, on the ground, brake assemblies 212 will be near their peak temperatures and either will begin to cool or will not increase in temperature significantly. As such, it is no longer be necessary to calculate an estimated peak brake assembly temperature for use in determining which brake assemblies 212 to activate. Therefore, after such a predetermined time period, brake assembly temperature sensor 214 communicates the current brake assembly temperatures to taxi brake selection module 300.

Taxi brake selection module 300 may then follow a similar process as that described above to determine which brake assemblies 212 to activate. However, instead of communicating the brake assembly temperatures to brake assembly temperature gain determination module 312, sensors 214 communicate the temperatures to a sensor correlation table 326. Because sensors 214 are positioned a distance from a respective brake assembly 212, the temperature sensed by sensor 214 may not be the actual temperature of the brakes in brake assembly 212. As such, the temperatures as sensed by sensors 214 are input into table 326, which includes a correction factor to determine an interpolated temperature of each brake of brake assembly 212. Once the estimated temperatures of the brakes are determined, these values are input into brake identification module 322 to determine which brake assemblies 212 to activate during the next taxi braking event.

Figure 4A:
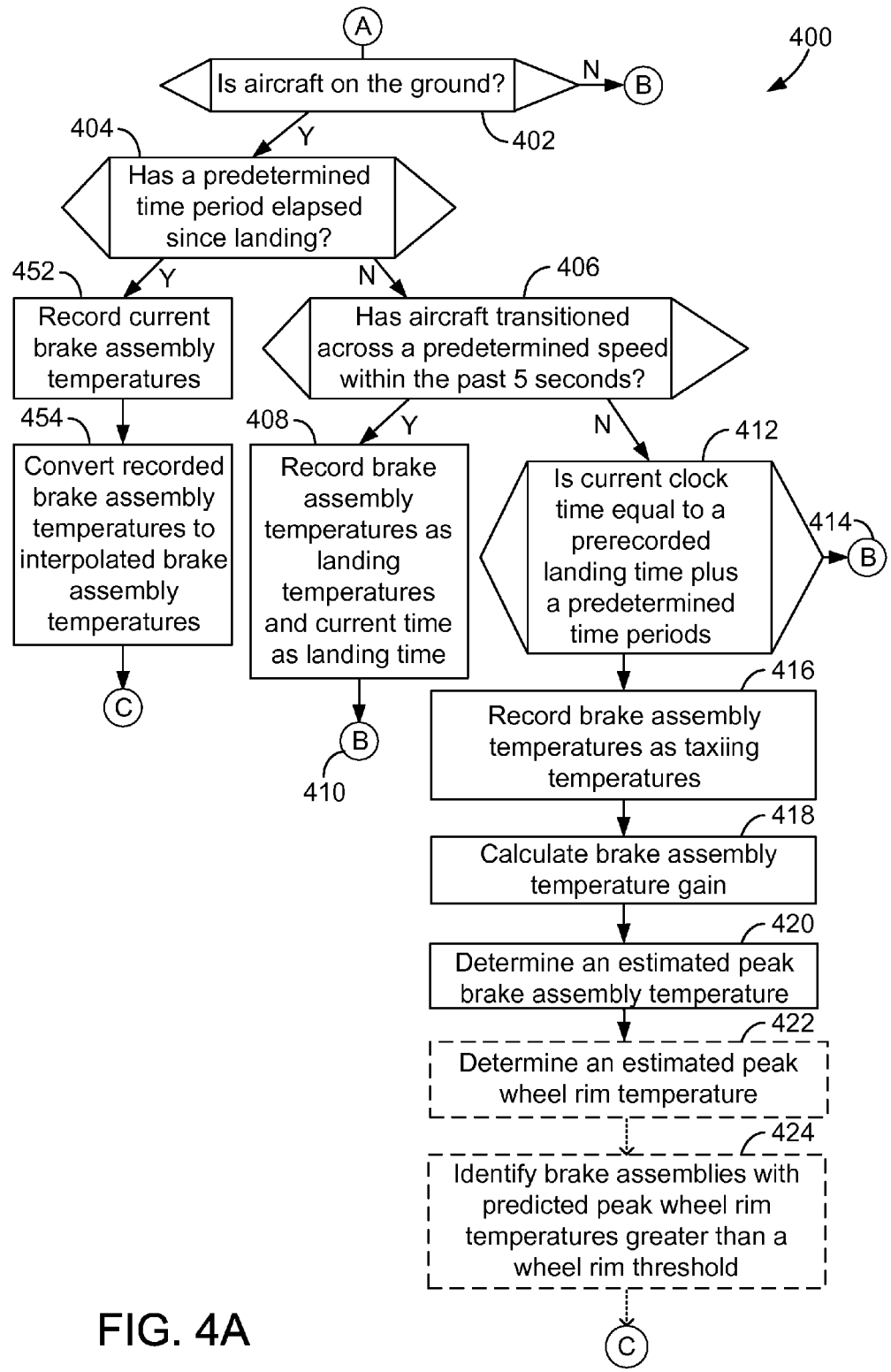
FIGS. 4A-4C are flow diagrams of an example method disclosed herein.
Figure 4B:
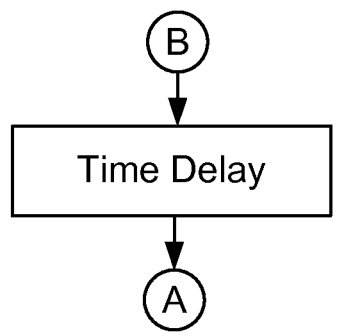
Figure 4C:
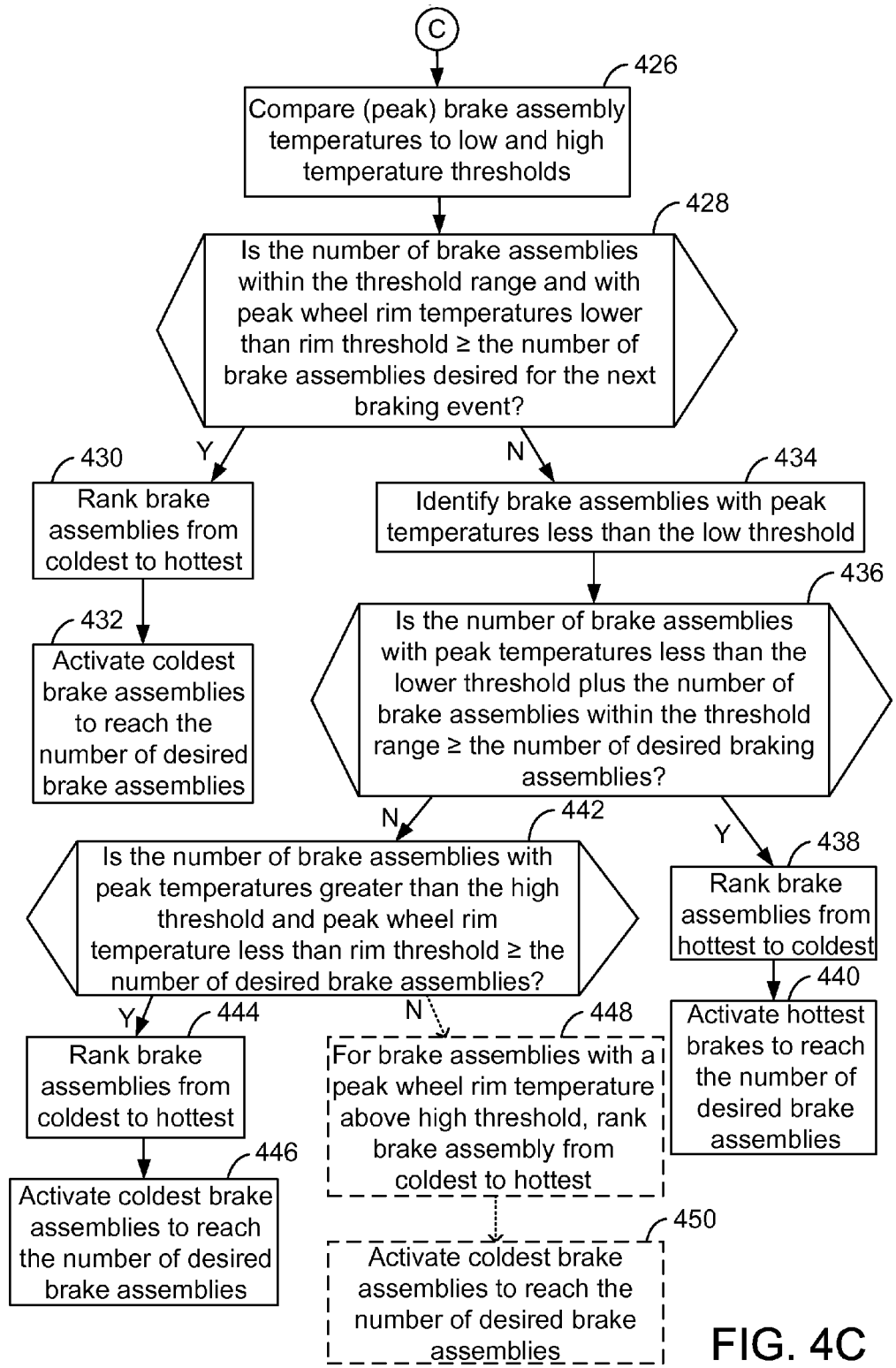

FIGS. 4A-4C are flow diagrams of an example method 400 of selecting brake assemblies, such as brake assemblies 212, on an aircraft, such as aircraft 100 (shown in FIG. 1). Method 400 is carried out by taxi brake selection system 200, and more specifically, by taxi brake selection module 300. The following steps of method 400 are described in a sequenced order of events. Alternatively, the steps of method 400 may be performed in any sequence that enables operation of taxi brake selection system 200 as described herein. The initial step in method 400 is determining 402 whether aircraft 100 is on the ground, such as runway 104 (shown in FIG. 1). Any existing system on aircraft 100 may be used to determine whether aircraft 100 has landed, such as, but not limited to, proximity sensors between two points on a landing gear strut or activation of at least one landing spoiler. If it is determined that aircraft 100 is not on the ground, then method 400 progresses to routine B shown in FIG. 4B. Routine B calls for a time delay or a predetermined period of time before querying whether aircraft 100 is on the ground again. In the exemplary implementation, the time period is 5 seconds. However, the length of the time period can be any time period that enables method 400 to operate as described herein.

If the query in step 402 is answered in the affirmative, then method 400 next determines 404 if a predetermined period of time has elapsed since aircraft 100 landed. In the exemplary implementation, the time period is ten minutes. However, the length of the time period can be any time period that enables method 400 to operate as described herein. A time period of ten minutes is chosen in step 404 because after brake assemblies 212 are activated during landing, heat builds up in brake assemblies 212 and reaches an approximate peak temperature approximately ten minutes after landing. As such, before the ten minute time period has elapsed, brake assemblies 212 have not yet reached their peak temperature even though the initial braking event at landing has already occurred.

When the query in step 404 is answered in the negative, method 400 progresses to step 406 to determine if aircraft 100 has transitioned across a predetermined speed setting within the past five seconds. More specifically, step 406 determines if aircraft 100 has transitioned from a speed above 50 knots to a speed below 50 knots within the past 5 seconds of being queried. The speed of 50 knots is exemplary only and not meant to be a limiting example. Generally, step 406 determines if a significant braking event has occurred at a relatively high speed within the past few seconds of being queried. The transition across the speed setting is the first time when a large amount of energy will have been input into brake assemblies 212 after landing.

If aircraft 100 has transitioned across the predetermined speed setting relatively recently, then method 400 records 408 the temperature of each brake assembly 212 as sensed by a respective brake assembly temperature sensor, such as sensor 214, and also records 408 the current landing time, as provided by a clock, such as clock 310, as the landing time. The landing time and brake assembly landing temperatures are stored in taxi brake selection module 300, and more specifically, in temperature gain determination module 312. In the exemplary implementation, the brake assembly temperatures are not taken at the exact time of landing because brake assemblies 212 will still be cold at such a time. Once brake assemblies 212 have been activated and aircraft 100 has transitioned across the predetermined speed setting, a large amount of energy will have been activated to brake assemblies 212 and their temperatures will begin to increase.

After recording 408 the brake assembly landing temperatures and aircraft 100 landing time, method 400 includes activating 410 the 5 second time delay of routine B before beginning method 400 over again at step 402. The second time through method 400 again results in an affirmative answer to step 402 and a negative answer to step 404. However, because of the time delay of routine B, the answer to the query of step 406 is now a negative. As such, method 400 includes determining 412 if the current clock time is equal to the landing time recorded in step 408 plus a predetermined time period. In the exemplary implementation, the predetermined time period in step 412 is approximately 30 seconds to 35 seconds. Alternatively, the predetermined time period in step 412 may be within a range of between approximately 15 seconds to approximately two minutes. As described above, the time period of 30-35 seconds is an example time period and any time period may be used in step 412 that enables method 400 to operate as described herein. Specifically, a time period of 30-35 seconds is used herein to allow the brake assemblies to absorb heat from the landing braking event and increase in temperature enough to provide an accurate peak temperature estimate, as described in further detail below, while still being within a predetermined amount of time between the initial landing braking event and a subsequent first taxiing braking event. The first time the logic in method 400 answers in the negative to step 406, the current clock time will not yet equal the landing time plus the 30-35 second time period. As such, method 400 progresses to step 414 where the 5 second delay of routine B is activated before returning again to step 402.

After a number of executions of steps 406, 412, and 414, where the answer to the query in step 412 is negative, eventually the clock time will equal the landing time plus 30-35 seconds, and an affirmative answer is given by the logic in step 412. When this affirmative answer is received, method 400 then records 416 the temperature of each brake assembly 212, as sensed by sensor 314, as a taxiing temperature and stores the recorded taxiing temperatures in taxi brake selection module 300, and more specifically in temperature gain determination module 312. As such, module 300 now includes the brake assembly landing temperatures at the landing time and also the brake assembly taxiing temperatures recorded a predetermined time period (30-35 seconds) after the landing time. In the exemplary implementation, the taxiing brake assembly temperatures are expected to be higher than the landing brake assembly temperatures because brake assemblies 212 have absorbed additional heat during the 30-35 second time difference between when the temperatures were recorded. Furthermore, as an option, the temperatures of the wheel rims of each wheel assembly, as measured by rim temperature sensor 210, may be recorded simultaneously with the brake assembly taxiing temperatures and stored in module 300, and more specifically in peak wheel rim temperature determination module 318.

Method 400 then includes calculating 418, by temperature gain determination module 312, a brake assembly temperature gain for each brake assembly 212. The gain is calculated by finding the difference between the taxiing temperature and the landing temperature for each brake assembly 212 and then dividing the result by the time difference between when the temperatures are recorded (30-35 seconds). The calculated gain provides a rate of change in degrees per second of the temperature of each brake assembly 212.

Once the gains are calculated, an estimated peak brake assembly temperature may then be determined 420, by module 314, by consulting a peak brake assembly temperature table, such as table 316. The estimated peak temperature for each brake assembly 212 is based on the recorded landing temperature and the calculated gain from step 418.

As an option, method 400 also includes step 422 where an estimated peak wheel rim temperature is determined, by module 318, by consulting a peak wheel rim temperature table, such as table 320. The estimated peak temperature for each wheel rim is based on the stored wheel rim temperature, as recorded in step 416, and the calculated gain from step 418. When the estimated peak wheel rim temperatures are determined, then method 400 also optionally includes identifying 424 which brake assemblies 212 have an estimated wheel rim temperature above a predetermined fuse plug melting threshold temperature stored in threshold table 324. As described above, each wheel assembly 202 includes at least one fuse plug 208 that enables tire 204 to be inflated and/or pressurized when a temperature of fuse plug 208 is below a threshold temperature. If the temperature of fuse plug 208 reaches or exceeds the threshold temperature, a portion of fuse plug 208 melts to release air from tire 204. As such, step 424 identifies which wheel assemblies 202 have estimated peak wheel rim temperatures approaching the fuse plug melting threshold so that application of brake assemblies 212 of those wheel assemblies 202 can be avoided to avoid deflation of the tire.

Once the estimated peak brake assembly temperatures have been determined in step 420, or alternatively, once wheel assemblies 202 with estimated peak wheel rim temperatures have been identified in step 424, method 400 includes the application of routine C, by taxi brake assembly identification module 322, to identify which brake assemblies 212 are to be activated during the next upcoming taxi braking event. Specifically, method 400 includes comparing 426 the estimated peak brake assembly temperatures to a set of predetermined low and high brake assembly temperature thresholds from threshold table 324. Brake assemblies 212 are subject to a lower threshold as well as a higher threshold because when brake assemblies 212 are relatively cold (below 150 degrees), they have a similar wear rate as brakes assemblies 212 that are relatively hot (above 1400 degrees). However, as described below, it is generally desirable to activate cold brake assemblies and accept the wear rate rather than activate the hot brake assemblies because hot brake assemblies are also at a higher risk of damage due to oxidation.

Method 400 then includes determining 428 whether the number of brake assemblies 212 within the temperature range defined by the low and high thresholds, and, optionally, those wheel assemblies 202 with estimated peak wheel rim temperatures lower than the fuse plug melting threshold is greater than or equal to the total number of brake assemblies 212 desired for the next taxi braking event. For example, in the exemplary implementation, rear landing gear unit 110 includes a plurality of Y total wheel and brake assemblies 202 and 212. However, only X of the total Y are desired for each taxi braking event. Step 428 of method 400 determines if the number of brake assemblies 212 within the accepted ranges is greater than or equal to X, as desired. To put another way, step 428 identifies a number N, or first subset, of brake assemblies 212 within the accepted ranges and compares the identified number, N, to the desired number of brake assemblies 212 to be activated, X. If N≥X, then the N braking assemblies 212 are ranked 430 in order from coldest to hottest estimated peak temperature and the N brake assemblies 212 are activated 432 in order from coldest to hottest until X brake assemblies 212 are reached. After the taxi braking event, method 400 begins again at step 402 to determine which brake assemblies 212 to activate during the next taxi braking event.

However, if the number of identified N brake assemblies 212 within the predetermined range and with an estimate peak wheel rim temperature below an upper threshold is determined 428 to be less than the number of desired brake assemblies 212, X, that is N<X, then module 322 identifies 434 which brake assemblies 212 include estimated peak temperatures less than the lower threshold. Such brake assemblies 212 may be identified as a second subset, or W, brake assemblies 212.

Once these such brake assemblies 212 are identified, that is, once W brake assemblies are identified, method 400 includes determining 436 if the number of brake assemblies 212 with estimated peak temperatures less than the lower threshold plus the number of brake assemblies 212 within the threshold range is greater than or equal to the number of desired braking assemblies 212. To use the example, step 436 determines whether W+N≥X. If so, then brake assemblies 212 within the threshold range and brake assemblies 212 with an estimated peak temperature below the lower threshold, that is, the N and W brake assemblies, are ranked 438 in order from hottest to coldest estimated peak temperature and activated 440 in order from coldest to hottest until X brake assemblies 212 are reached. After the taxi braking event, method 400 begins again at step 402 to determine which brake assemblies 212 to activate during the next taxi braking event.

However, if the number of brake assemblies 212 with an estimated peak temperature less than the lower threshold plus the number of brake assemblies 212 within the threshold range is less than or equal to the number of desired braking assemblies 212, that is W+N<X, then method 400 identifies 442 which brake assemblies 212 have an estimated peak brake assembly temperature higher than the brake assembly high threshold and also have an estimated peak wheel rim temperature less than the fuse plug melting threshold. For example, such assemblies 212 are identified as a third subset, or Z, assemblies. In the same step 442, method 400 also determines if the number of brake assemblies 212 with an estimated peak brake assembly temperature higher than the high threshold and an estimated peak wheel rim temperature less than the fuse plug melting threshold plus the number of brake assemblies 212 with an estimated peak temperature below the low threshold plus the number of brake assemblies 212 with an estimated peak temperature with the defined range is greater than or equal to the number of desired brake assemblies 212 to be activated. That is, using the example labels, step 442 determines if $Z+W+N \geq X$.

When step 442 can be answered in the affirmative, method 400 includes ranking 444 the Z, W, and N brake assemblies 212 from coldest to hottest and activating 446 the coldest brake assemblies 212 to reach the desired number, X, of brake assemblies 212 for the taxi braking event.

However, when the query of step 442 is answered in the negative, method 400 identifies 448 which assemblies have an estimated peak wheel rim temperature above the fuse plug melting threshold, V assemblies, and ranks the V, Z, W, and N brake assemblies 212 from coldest to hottest. Method 400 then includes activating 450 the coldest brake assemblies 212 to reach the desired number, X, of brake assemblies 212 for the taxi braking event.

In the exemplary implementation, the logic of method 400 determines 428 the number of brake assemblies, N, having an estimated peak brake assembly temperature within the defined thresholds. If the number of identified brake assemblies is less than the number of assemblies required for braking, X, then method 400 next identifies 434 the number of brake assemblies, W, with an estimated peak brake assembly temperature below the low threshold. As described above, it is desirable to activate relatively cold brake assemblies rather than hot brake assemblies to reduce the likelihood of brake oxidation. If the number of N brake assemblies plus the number of W brake assemblies is still less than the number of desired brake assemblies, X, then method 400 identifies 442 the number of brake assemblies, Z, with an estimated peak brake assembly temperature above the high threshold but whose estimated peak wheel rim temperature is below the fuse plug melting threshold. If the desired number of brake assemblies, X, is still not reached, then method 400 ranks the remaining brake assemblies, the V assemblies, from coldest to hottest for application.

As described above, inclusion of the wheel rim temperatures and fuse plug melting threshold is optional. In such an implementation, steps 422 and 424 of method 400 may be removed, as indicated by use of broken lines. Further, when wheel rim temperatures are not accounted for, step 442 simply ranks the remaining Z brake assemblies 212, those with an estimated peak brake assembly temperature above the high limit, in order from coldest to hottest and applies the number of Z assemblies 212 required to reach the number of desired brake assemblies, X. As such, steps 448 and 450 of method 400 may be removed, as indicated by use of broken lines.

In the exemplary implementation, step 406 through step 450 describe a process of selecting brake assemblies 212 for use in an upcoming taxi braking event when the answer to the query presented in step 404 was answered in the negative. More specifically, steps 406 through step 450 describe the method of selecting brake assemblies 212 before a predetermined time period has elapsed. However, it remains possible that taxi braking events could occur after the predetermined period has elapsed. For example, such a situation may occur if aircraft 100 has to wait on the runway for traffic to clear or their designated gate to become available. Additionally, when taxiing for take-off, aircraft 100 has been on the ground for more than the predetermined time period. As described above, when aircraft 100 has landed and has spent a predetermined amount of time, 10 minutes in the exemplary implementation, on the ground, brake assemblies 212 will be near their peak temperatures and either will begin to cool or will not increase in temperature significantly. As such, it is no longer necessary to calculate an estimated peak brake assembly temperature for use in determining which brake assemblies 212 to activate during the next taxi braking event.

Accordingly, when the query in step 404 is answered in the affirmative, method 452 includes recording the brake assembly temperatures, as sensed by sensors 214, in taxi brake selection module 300. Because sensors 214 are positioned a distance away from the brake assemblies 212, the temperature as sensed is converted 454 to an interpolated brake assembly temperature. Specifically, the sensed temperatures are input into sensor correlation table 326 and a correlation factor is applied to the sensed temperatures to determine the interpolated temperature of brake assemblies 212. Once the actual brake assembly temperatures are determined, method 400 progresses through routine C to determine which brake assemblies 212 to activate for the next taxi braking event. Specifically, steps 426 through step 450 are performed by brake assembly identification module 322 by substituting the current interpolated brake assembly temperatures as determined in step 454 for the estimated peak brake assembly temperatures.

Figure 5:
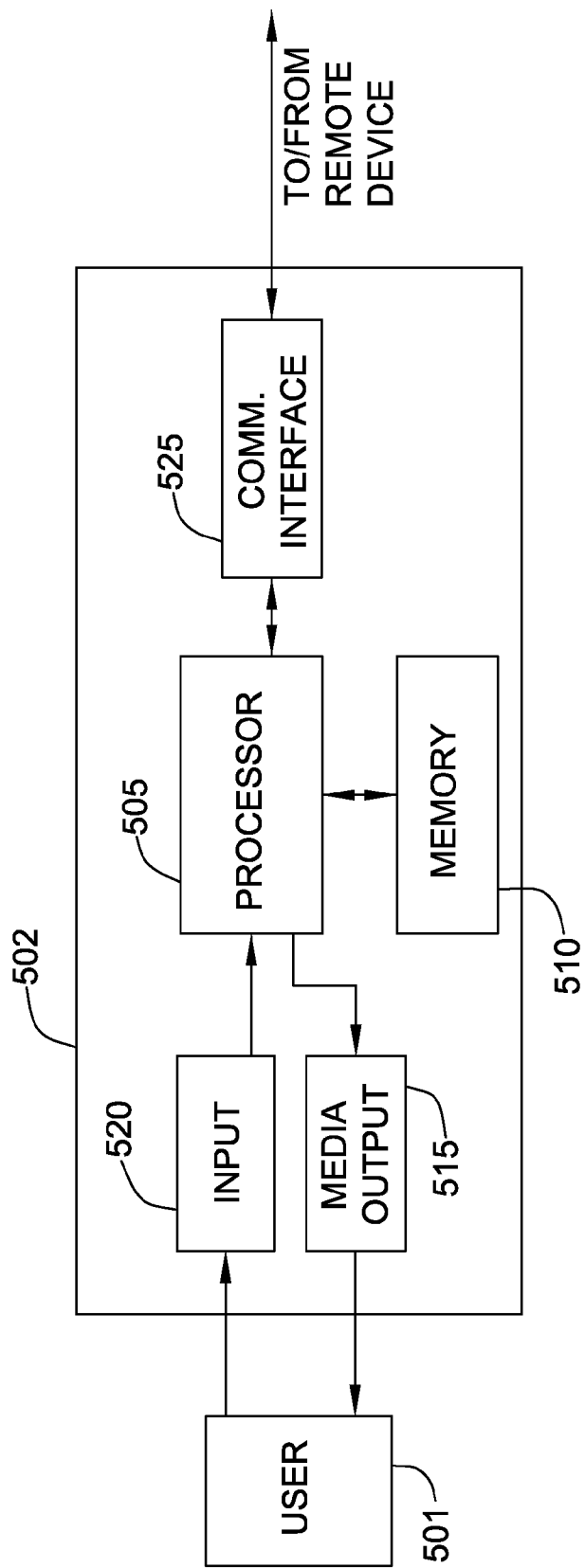
FIG. 5 is a block diagram of an example computing device used in the brake selection system of FIG. 1.

FIG. 5 is a block diagram of an example computing device 502 capable of executing machine readable instructions to implement the taxi brake selection system 200 of FIGS. 2 and 3. Computing device 502 is representative of cockpit control system 302 and/or monitoring device 306. More specifically, cockpit control system 302 and/or monitoring device 306 include one or more components of computing device 502. Computing device 502 includes at least one processor 505 for executing instructions. In some implementations, executable instructions are stored in a memory device 510. Processor 505 may include one or more processing units (e.g., in a multi-core configuration). One or more memory devices 510 are any one or more devices allowing information such as executable instructions and/or other data to be stored and retrieved. One or more memory devices 510 may include one or more computer-readable media.

Computing device 502 also includes at least one media output component 515 for presenting information to a user 501. Media output component 515 is any component capable of conveying information to user 501. In some implementations, media output component 515 includes an output adapter such as a video adapter and/or an audio adapter. An output adapter is operatively coupled to processor 505 and operatively couplable to an output device such as a display device, such as cockpit display 304 and/or display 308, (e.g., a liquid crystal display (LCD), organic light emitting diode (OLED) display, cathode ray tube (CRT), or "electronic ink" display) or an audio output device (e.g., a speaker or headphones).

In some implementations, computing device 502 includes an input device 520 for receiving input from user 501. Input device 520 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 515 and input device 520.

Computing device 502 additionally includes a communication interface 525, which is communicatively couplable to a remote device such as another computing device 502. Communication interface 525 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in one or more memory devices 510 are, for example, computer-readable instructions for providing a user interface to user 501 via media output component 515 and, optionally, receiving and processing input from input device 520. A user interface may include, text, graphics, and/or sound that enable user 501 to interact with computing device 502.

The examples described herein include methods and systems for reducing the wear on aircraft brakes during taxiing events. The examples described herein include a taxi brake selection module that determines which brake assemblies of a plurality of brake assemblies per landing gear unit to activate during an upcoming taxi braking event. More specifically, the taxi brake selection module uses information provided by temperature sensors to calculate a temperature rate of change for each brake assembly and an estimated peak brake temperature and an estimated peak wheel rim temperature for each brake assembly and then determines which brake assemblies to activate based on the resulting estimated peak temperatures. The taxi brake selection module includes a taxi brake identification module that executes programmed logic to determine which brake assemblies to activate. More specifically, the taxi brake identification module determines a first subset of the total number of brake assemblies that have an estimated peak temperature within a threshold range and, if the number of brake assemblies in the first subset is greater than or equal to a number of desired brake assemblies for braking, then the coldest of the brake assemblies in the first subset are activated.

Additionally, if the number of brake assemblies in the first subset is determined to be less than the number of desired brake assemblies, then the taxi brake identification module determines a second subset of the total number of brake assemblies that have an estimated peak temperature less than the low threshold temperature. The brake assemblies from the first and second subsets are then activated such that total number of activated brake assemblies equals the number of desired brake assemblies. Specifically, the taxi brake identification module activates the hottest of the brake assemblies in the second subset as needed.

The implementations described herein facilitate reducing brake assembly wear during taxi braking events of an aircraft. Specifically, the implementations described herein activate a desired number of brake assemblies based on an estimated peak temperature of each brake assembly rather than simply cycling through the different brake assemblies. The process reduces the risk of brake oxidation and activates only the brake assemblies in the optimal temperature condition to reduce wear and prevent oxidation. As such, the life of the carbon brake assemblies is lengthened and the costs associated with maintaining and replacing the brake assemblies is reduced.

Although specific features of various examples of the invention may be shown in some drawings and not in others, this is for convenience only. In accordance with the principles of the invention, any feature of a drawing may be referenced and/or claimed in combination with any feature of any other drawing.

This written description uses examples to disclose various examples, which include the best mode, to enable any person skilled in the art to practice those examples, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of selecting a plurality of brake assemblies desired for activation during an aircraft taxi braking event from a total number of brake assemblies, said method comprising:
    determining an estimated peak temperature for a plurality of brake assemblies of the total number of brake assemblies;
    determining a first subset of the plurality of brake assemblies having an estimated peak temperature greater than a low threshold temperature and less than a high threshold temperature;
    determining whether the number of brake assemblies in the first subset is greater than or equal to the number of brake assemblies desired for braking;
    activating at least one of the brake assemblies in the first subset for the next taxi braking event if the number of brake assemblies in the first subset is determined to be greater than or equal to the number of desired brake assemblies, wherein the number of brake assemblies in the activated portion of the first subset is greater than or equal to the number of desired brake assemblies;
    determining a second subset of the plurality of brake assemblies having an estimated peak temperature less than the low threshold temperature; and
    activating at least one of the brake assemblies in the first subset and activating at least one of the brake assemblies in the second subset for the next braking event if the number of brake assemblies in the first subset is determined to be less than the number of desired brake assemblies, wherein the number of brake assemblies in the first subset and the number of brake assemblies in the activated portion of the second subset is greater than or equal to the number of desired brake assemblies.

2. The method in accordance with claim 1 further comprising:
    ranking the first subset of brake assemblies in order from coldest to hottest according to the determined estimated peak temperature; and
    activating the coldest brake assemblies of the first subset up to the number of desired brake assemblies.

3. The method in accordance with claim 1 further comprising:
    ranking the second subset of brake assemblies in order from hottest to coldest according to the determined estimated peak temperature; and activating the hottest brake assemblies of the second subset such that the total number of activated brake assemblies is equal to or greater than the number of desired brake assemblies.

4. The method in accordance with claim 1 further comprising:
determining a third subset of the plurality of brake assemblies having an estimated peak temperature above the high threshold temperature;
activating at least one of the brake assemblies in the first and the second subsets and activating at least one of the brake assemblies in the third subset for the next braking event if the number of brake assemblies in the first and second subsets is determined to be less than the number of desired brake assemblies, wherein the number of brake assemblies in the first and second subsets and the number of brake assemblies in the activated portion of the third subset is greater than or equal to the number of desired brake assemblies.

5. The method in accordance with claim 4 further comprising:
ranking the third subset of brake assemblies in order from coldest to hottest according to the determined estimated peak temperature; and
activating the coldest brake assemblies of the third subset such that the total number of activated brake assemblies is greater than or equal to the number of desired brake assemblies.

6. The method in accordance with claim 1, wherein determining an estimated peak temperature for a plurality of brake assemblies of the total number of brake assemblies comprises:
determining a temperature rate of change per second of the plurality of brake assemblies; and
interpolating the determined rate of change with predetermined data to determine an estimated peak temperature for the plurality of brake assemblies.

7. The method in accordance with claim 6, wherein determining a temperature rate of change per second of the plurality of brake assemblies comprises:
determining if the aircraft, upon landing, has crossed a predetermined speed threshold within a predetermined time period;
recording a first temperature of the plurality of brake assemblies at a first time after landing;
recording a second temperature of the plurality of brake assemblies at a second time after landing that is after the first time; and
determining the difference between the first temperature and the second temperature for the plurality of brake assemblies over the difference between the first time and the second time.

8. The method in accordance with claim 7, wherein the second time is within a range of between approximately 15 seconds to approximately two minutes after the first time.

9. The method in accordance with claim 1, wherein the plurality of brake assemblies each include a wheel rim, the method further comprising:
determining an estimated peak temperature of at least one wheel rim based on the determined estimated peak temperature of a respective brake assembly.

10. The method in accordance with claim 9, wherein determining a first subset of the plurality of brake assemblies further comprises determining a first subset of the plurality of brake assemblies having an estimated peak wheel rim temperature less than a predetermined wheel rim temperature threshold.

11. The method in accordance with claim 9, wherein determining a third subset of the plurality of brake assemblies further comprises determining a third subset of the plurality of brake assemblies having an estimated peak wheel rim temperature less than a predetermined wheel rim temperature threshold.

12. A taxi brake selection system for activating a desired number of brake assemblies during a taxi braking event, said system comprising:
a plurality of brake assemblies;
a plurality brake assembly temperature sensors, wherein each sensor is positioned proximate a respective one brake assembly of said plurality of brake assemblies;
a taxi brake selection module communicatively coupled to said plurality of sensors, said taxi brake selection module configured to:
receive signals indicative of a brake assembly temperature from at least one sensor of said plurality of sensors;
determine an estimated peak temperature for at least a portion of the brake assemblies of said plurality of brake assemblies based on the received temperature signals;
determine a first subset of the portion of brake assemblies of said plurality of brake assemblies, wherein at least one said brake assembly in said first subset of brake assemblies has an estimated peak temperature greater than a low threshold temperature and less than a high threshold temperature;
determine whether the number of said brake assemblies in said first subset is greater than or equal to a number of said brake assemblies desired for braking,
activate said at least one of brake assemblies in said first subset for the next taxi braking event if the number of brake assemblies in said first subset is determined to be greater than or equal to the number of said desired brake assemblies, wherein the number of said brake assemblies in said activated portion of said first subset is equal to the number of desired brake assemblies;
a plurality of wheel rims; and
a plurality wheel rim temperature sensors communicatively coupled to said taxi brake selection module, wherein each wheel rim sensor is positioned proximate a respective one wheel of said plurality of wheels, wherein said taxi brake selection module is further configured to:
receive signals indicative of a wheel rim temperature from at least one wheel rim sensor of said plurality of wheel rim sensors;
determine an estimated peak wheel rim temperature for the at least one wheel rim based on the received wheel rim temperature signals; and
determine a number of brake assemblies in said first subset that have an associated estimated peak wheel rim temperature below a wheel rim temperature threshold.

13. The taxi brake selection system in accordance with claim 12, wherein said taxi brake selection module is further configured to:
determine a second subset of said portion of brake assemblies, wherein at least one brake assembly in said second subset of said brake assemblies has an estimated peak temperature less than the low threshold temperature; and
activate said at least one of brake assemblies in said first subset and activate at least one of said brake assemblies in said second subset for the next braking event if the number of said brake assemblies in said first subset is determined to be less than the number of desired brake assemblies, wherein the number of said brake assemblies in said first subset and the number of said brake assemblies in said activated portion of said second subset is greater than or equal to the number of desired brake assemblies.

14. The taxi brake selection system in accordance with claim 12, wherein said taxi brake selection module is further configured to:
   determine a third subset of said portion of brake assemblies, wherein at least one brake assembly in said third subset of said brake assemblies has an estimated peak temperature greater than the high threshold temperature; and
   activate said at least one of said brake assemblies in said first and said second subsets and activate at least one of said brake assemblies in said third subset for the next braking event if the number of said brake assemblies in said first and said second subsets is determined to be less than the number of said desired brake assemblies, wherein the number of said brake assemblies in said first and said second subsets and the number of said brake assemblies in said activated portion of said third subset is greater than or equal to the number of said desired brake assemblies.

15. A computer-readable storage device comprising computer-executable instructions for selecting brake assemblies for use in a taxi braking event, wherein, when executed by a taxi brake selection system, said computer-executable instructions cause the taxi brake selection system to:
   determine an estimated peak temperature for a plurality of brake assemblies of the total number of brake assemblies;
   determine a first subset of the plurality of brake assemblies having an estimated peak temperature greater than a low threshold temperature and less than a high threshold temperature;
   determine whether the number of brake assemblies in the first subset is greater than or equal to the number of brake assemblies desired for braking; and
   activate at least one of the brake assemblies in the first subset for the next taxi braking event if the number of brake assemblies in the first subset is determined to be greater than or equal to the number of desired brake assemblies, wherein the number of brake assemblies in the activated portion of the first subset is equal to the number of desired brake assemblies;
   determine a second subset of the plurality of brake assemblies having an estimated peak temperature less than the low threshold temperature; and
   activate at least one of the brake assemblies in the first subset and activate at least one of the brake assemblies in the second subset for the next braking event if the number of brake assemblies in the first subset is determined to be less than the number of desired brake assemblies, wherein the number of brake assemblies in the first subset and the number of brake assemblies in the activated portion of the second subset is greater than or equal to the number of desired brake assemblies.

16. The computer-readable storage device of claim 15, wherein said computer-executable instructions additionally cause the taxi brake selection system to:
   determine a third subset of the plurality of brake assemblies having an estimated peak temperature above the high threshold temperature;
   activate at least one of the brake assemblies in the first and the second subsets and activate at least one of the brake assemblies in the third subset for the next braking event if the number of brake assemblies in the first and second subsets is determined to be less than the number of desired brake assemblies, wherein the number of brake assemblies in the first and second subsets and the number of brake assemblies in the activated portion of the third subset is greater than or equal to the number of desired brake assemblies.

17. The computer-readable storage device of claim 15, wherein determining an estimated peak temperature for a plurality of brake assemblies comprises causing the taxi brake selection system to:
   determine a temperature rate of change per second of the plurality of brake assemblies, comprising:
      determine if the aircraft, upon landing, has crossed a predetermined speed threshold within a predetermined time period;
      record a first temperature of the plurality of brake assemblies at a first time after landing;
      record a second temperature of the plurality of brake assemblies at a second time after landing that is after the first time; and
      determine the difference between the first temperature and the second temperature for each brake assembly over the difference between the first time and the second time; and
   interpolate the determined rate of change with predetermined data to determine an estimated peak temperature for the plurality of brake assemblies.

18. A method of selecting a plurality of brake assemblies desired for activation during an aircraft taxi braking event from a total number of brake assemblies, said method comprising:
   determining an estimated peak temperature for a plurality of brake assemblies of the total number of brake assemblies, wherein determining an estimated peak temperature for a plurality of brake assemblies comprises:
      determining a temperature rate of change per second of the plurality of brake assemblies; and
      interpolating the determined rate of change with predetermined data to determine an estimated peak temperature for the plurality of brake assemblies;
   determining a first subset of the plurality of brake assemblies having an estimated peak temperature greater than a low threshold temperature and less than a high threshold temperature;
   determining whether the number of brake assemblies in the first subset is greater than or equal to the number of brake assemblies desired for braking; and
   activating at least one of the brake assemblies in the first subset for the next taxi braking event if the number of brake assemblies in the first subset is determined to be greater than or equal to the number of desired brake assemblies, wherein the number of brake assemblies in the activated portion of the first subset is greater than or equal to the number of desired brake assemblies.

19. The method in accordance with claim 18, wherein determining a temperature rate of change per second of the plurality of brake assemblies comprises:

determining if the aircraft, upon landing, has crossed a predetermined speed threshold within a predetermined time period;

recording a first temperature of the plurality of brake assemblies at a first time after landing;

recording a second temperature of the plurality of brake assemblies at a second time after landing that is after the first time; and determining the difference between the first temperature and the second temperature for the plurality of brake assemblies over the difference between the first time and the second time.

20. The method in accordance with claim 19, wherein the second time is within a range of between approximately 15 seconds to approximately two minutes after the first time.

* * * * *